United States Patent
Tsujita

(10) Patent No.: US 12,109,851 B2
(45) Date of Patent: Oct. 8, 2024

(54) TRANSMITTER, RECEIVER, AND TRANSMISSION-RECEPTION SYSTEM

(71) Applicant: PACIFIC INDUSTRIAL CO., LTD., Gifu-ken (JP)

(72) Inventor: Yasuhisa Tsujita, Motosu (JP)

(73) Assignee: PACIFIC INDUSTRIAL CO., LTD., Ogaki (JP)

( * ) Notice: Subject to any disclaimer, the term of this patent is extended or adjusted under 35 U.S.C. 154(b) by 151 days.

(21) Appl. No.: 17/312,210

(22) PCT Filed: Aug. 29, 2019

(86) PCT No.: PCT/JP2019/033898
§ 371 (c)(1),
(2) Date: Jun. 9, 2021

(87) PCT Pub. No.: WO2021/038791
PCT Pub. Date: Mar. 4, 2021

(65) Prior Publication Data
US 2022/0176756 A1     Jun. 9, 2022

(51) Int. Cl.
*B60C 23/04*   (2006.01)
*B60R 16/023*  (2006.01)

(52) U.S. Cl.
CPC ...... *B60C 23/0415* (2013.01); *B60C 23/0494* (2013.01); *B60R 16/0232* (2013.01)

(58) Field of Classification Search
CPC ............ B60C 23/0415; B60C 23/0494; B60C 23/0488; B60C 23/0462; B60R 16/0232
USPC .......................................................... 701/29
See application file for complete search history.

(56) References Cited

U.S. PATENT DOCUMENTS

| | | | |
|---|---|---|---|
| 2002/0124637 A1* | 9/2002 | Saheki | B60C 23/0494 73/146 |
| 2003/0066343 A1* | 4/2003 | Fischer | B60C 23/0408 73/146 |
| 2007/0144248 A1* | 6/2007 | Okubo | B60C 23/0494 73/146.4 |

(Continued)

FOREIGN PATENT DOCUMENTS

JP    2000185532 A    7/2000
JP    2011513123 A    4/2011

(Continued)

OTHER PUBLICATIONS

International Search Report for Application No. PCT/JP2019033898 mailed Oct. 8, 2019, 4 pages.

*Primary Examiner* — Yonel Beaulieu
*Assistant Examiner* — Jean W Charleston
(74) *Attorney, Agent, or Firm* — CANTOR COLBURN LLP

(57) ABSTRACT

A transmitter includes a data generating unit configured to generate transmission data, a transmitting unit configured to transmit the transmission data to a receiver that includes a setting unit that sets a threshold for controlling a vehicle in accordance with the type of the tire valve, and a controlling unit that causes the transmitting unit to transmit the transmission data. The transmission data is information with which the setting unit sets the threshold. The transmission data includes valve identification information for causing the setting unit to recognize the type of the tire valve to which the transmitter is attached.

7 Claims, 6 Drawing Sheets

(56) References Cited

U.S. PATENT DOCUMENTS

| | | | |
|---|---|---|---|
| 2008/0156087 A1 | 7/2008 | Wu et al. | |
| 2010/0326180 A1 | 12/2010 | Nagora et al. | |
| 2011/0079337 A1* | 4/2011 | Botte | B60C 23/0494 |
| | | | 29/894.31 |
| 2011/0203711 A1* | 8/2011 | Monjuvent | B60C 29/00 |
| | | | 152/427 |
| 2013/0054079 A1* | 2/2013 | Shibata | B60C 23/0415 |
| | | | 701/29.2 |
| 2014/0216147 A1* | 8/2014 | Kanenari | B60C 23/04 |
| | | | 141/4 |
| 2017/0241566 A1* | 8/2017 | Taki | B60C 23/0494 |
| 2020/0254831 A1* | 8/2020 | Yamada | B60C 23/0494 |

FOREIGN PATENT DOCUMENTS

| | | |
|---|---|---|
| JP | 2017149251 A | 8/2017 |
| WO | 2018122925 A1 | 7/2018 |

* cited by examiner

| Preamble | ID Code | Valve Identification Information |
|---|---|---|

| Type of Tire Valve | Upper Limit of Vehicle Speed | Warning Threshold |
|---|---|---|
| Clamp-In | First Vehicle Speed Threshold | First Pressure Threshold |
| Snap-In | Second Vehicle Speed Threshold | Second Pressure Threshold |

TRANSMITTER, RECEIVER, AND TRANSMISSION-RECEPTION SYSTEM

TECHNICAL FIELD

The present invention relates to a transmitter, a receiver, and a transmission-reception system.

BACKGROUND ART

A transmission-reception system has been known that includes a receiver and a transmitter configured to be attached to a tire valve. The transmitter includes a sensor, a data generating unit configured to generate transmission data, and a transmitting unit configured to transmit the transmission data. The receiver receives the transmission data transmitted by the transmitter. Patent Document 1 discloses a transmitter that can be attached to a snap-in valve and a clamp-in valve.

PRIOR ART DOCUMENT

Patent Document

Patent Document 1: Japanese National Phase Laid-Open Patent Publication No. 2011-513123

SUMMARY OF THE INVENTION

Problems that the Invention is to Solve

There has been a demand to properly control a vehicle by using a transmission-reception system.

It is an objective of the present invention to provide a transmitter, a receiver, and a transmission-reception system that are capable of properly controlling a vehicle.

Means for Solving the Problems

To achieve the foregoing objective and in accordance with a first aspect of the present invention, a transmitter configured to be attachable to a plurality of types of tire valves is provided. The transmitter includes a data generating unit configured to generate transmission data, a transmitting unit configured to transmit the transmission data to a receiver that includes a setting unit that sets a threshold for controlling a vehicle in accordance with the type of the tire valve, and a controlling unit that causes the transmitting unit to transmit the transmission data. The transmission data is information with which the setting unit sets the threshold. The transmission data includes valve identification information for causing the setting unit to recognize the type of the tire valve to which the transmitter is attached.

With this configuration, the transmitter transmits the transmission data including the valve identification information. The valve identification information is configured to cause the setting unit of the receiver to recognize the type of the tire valve. The receiver is thus capable of recognizing the type of the tire valve to which the transmitter is attached from the valve identification information. Since the setting unit sets the threshold used in the control of the vehicle in accordance with the type of the tire valve, the vehicle can be controlled properly in accordance with the type of the tire valve.

In the above-described transmitter, the types of tire valves include a snap-in valve and a clamp-in valve. The transmitter may further include an acceleration sensor configured to detect a centrifugal acceleration that acts on the transmitter as a wheel rotates, and a determining unit configured to determine whether the tire valve to which the transmitter is attached is the snap-in valve or the clamp-in valve based on the centrifugal acceleration detected by the acceleration sensor and a period of a gravitational acceleration component included in a detection value of the acceleration sensor.

This configuration allows for a determination as to whether the tire valve is the snap-in valve or the clamp-in valve from the detection value of the acceleration sensor.

To achieve the foregoing objective and in accordance with a second aspect of the present invention, a transmitter configured to be attachable to a plurality of types of tire valves is provided. The transmitter includes a pressure sensor configured to detect a pressure of a tire, a data generating unit configured to generate transmission data, a transmitting unit configured to transmit the transmission data to a receiver, a determining unit configured to determine the type of the tire valve to which the transmitter is attached, a warning transmission controlling unit configured to cause the transmitting unit to perform warning transmission for causing the receiver to issue a warning when a detection value of the pressure sensor exceeds a threshold, a transmitter memory unit configured to store a correspondence relationship between the type of the tire valve and the threshold, and a warning threshold setting unit configured to set, from the correspondence relationship, the threshold in accordance with the type of the tire valve determined by the determining unit.

With this configuration, the warning threshold setting unit is capable of setting a threshold corresponding to the type of the tire valve. When the detection value of the pressure sensor exceeds the threshold, the warning transmission controlling unit causes the transmitting unit to perform the warning transmission. This allows the receiver to issue a warning. The receiver is allowed to issue a warning, which is one mode of the vehicle control, in accordance with the type of the tire valve. The vehicle can thus be controlled properly in accordance with the type of the tire valve.

To achieve the foregoing objective and in accordance with a third aspect of the present invention, a transmitter configured to be attachable to a plurality of types of tire valves is provided. The transmitter includes an acceleration sensor configured to detect a centrifugal acceleration that acts on the transmitter as a wheel rotates, a data generating unit configured to generate transmission data, a transmitting unit configured to transmit the transmission data to a receiver, a determining unit configured to determine the type of the tire valve to which the transmitter is attached, a warning transmission controlling unit configured to cause the transmitting unit to perform warning transmission for causing the receiver to issue a warning when a detection value of the acceleration sensor exceeds a threshold, a transmitter memory unit configured to store a correspondence relationship between the type of the tire valve and the threshold, and a warning threshold setting unit configured to set, from the correspondence relationship, the threshold in accordance with the type of the tire valve determined by the determining unit.

With this configuration, the warning threshold setting unit is capable of setting a threshold corresponding to the type of the tire valve. When the detection value of the acceleration sensor exceeds the threshold, the warning transmission controlling unit causes the transmitting unit to perform the warning transmission. This allows the receiver to issue a warning. The receiver is allowed to issue a warning, which is one mode of the vehicle control, in accordance with the type of the tire valve. The vehicle can thus be controlled properly in accordance with the type of the tire valve.

To achieve the foregoing objective and in accordance with a fourth aspect of the present invention, a receiver configured to receive transmission data transmitted from a transmitter attachable to a plurality of types of tire valves is provided. The receiver includes a receiving unit configured to receive the transmission data, a receiving memory unit configured to store a correspondence relationship between the type of the tire valve and a threshold for controlling a vehicle, an obtaining unit configured to obtain valve identification information from the transmission data received by the receiving unit, and a setting unit configured to recognize, from the valve identification information, the type of the tire valve to which the transmitter is attached, and to set, from the correspondence relationship, the threshold in accordance with the recognized type of the tire valve.

With this configuration, since the setting unit of the receiver sets the threshold used in the control of the vehicle from the valve identification information obtained from the transmission data, the vehicle can be controlled properly in accordance with the type of the tire valve.

In the above-described receiver, the transmission data may include pressure data of a tire, and the threshold may include a warning threshold for causing a warning to be issued when the pressure of the tire reaches or exceeds the threshold.

The tire pressure that can be handled can vary depending on the type of the tire valve. Since the warning threshold is set in accordance with the type of the tire valve, a warning can be issued in accordance with the type of the tire valve.

In the above-described receiver, the threshold may include an upper limit of a vehicle speed of the vehicle.

The vehicle speed that can be handled can vary depending on the type of the tire valve. Since the upper limit of the vehicle speed is set in accordance with the type of the tire valve, control corresponding to the type of the tire valve can be performed.

To achieve the foregoing objective and in accordance with a fifth aspect of the present invention, a transmission-reception system is provided that includes a transmitter configured to be attachable to a plurality of types of tire valves, and a receiver configured to receive transmission data transmitted from the transmitter. The transmitter includes a data generating unit configured to generate the transmission data, a transmitting unit configured to transmit the transmission data, and a controlling unit that causes the transmitting unit to transmit the transmission data including valve identification information for causing the type of the tire valve to which the transmitter is attached to be recognized. The receiver includes a receiving unit configured to receive the transmission data, a receiving memory unit configured to store a correspondence relationship between the type of the tire valve and a threshold for controlling a vehicle, an obtaining unit configured to obtain the valve identification information from the transmission data received by the receiving unit, and a setting unit configured to recognize, from the valve identification information, the type of the tire valve to which the transmitter is attached, and to set, from the correspondence relationship, the threshold in accordance with the recognized type of the tire valve.

With this configuration, since the setting unit of the receiver sets the threshold used in the control of the vehicle based on the valve identification information obtained from the transmission data, the vehicle can be controlled properly in accordance with the type of the tire valve.

Effects of the Invention

The present invention is capable of properly performing control of a vehicle.

MODES FOR CARRYING OUT THE INVENTION

First Embodiment

A transmitter, a receiver, and a transmission-reception system according to a first embodiment will now be described.

Figure 1:
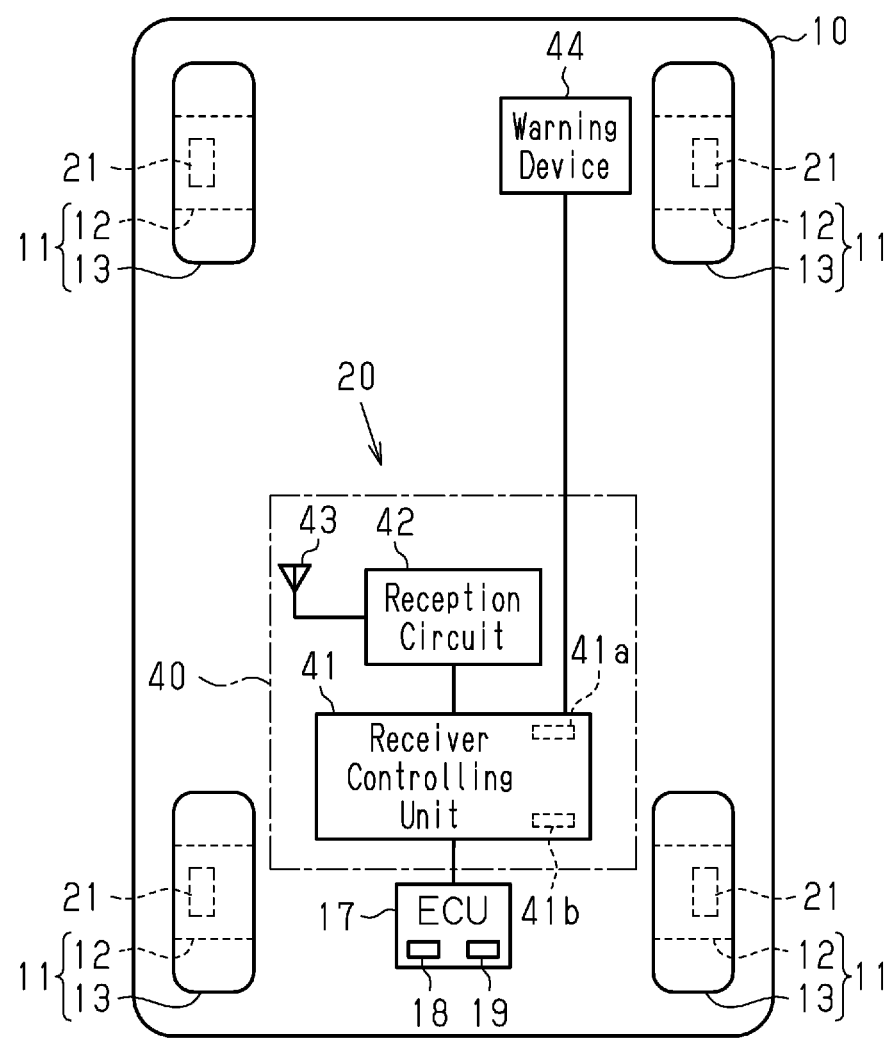
FIG. 1 is a schematic diagram of a vehicle and a transmission-reception system mounted on the vehicle.

As shown in FIG. 1, a vehicle 10 includes four wheel assemblies 11 and an ECU 17. The ECU 17 is an electronic control unit that includes a CPU 18 and a memory unit 19, which are hardware. The ECU 17 performs control such as control of traveling of the vehicle 10. The memory unit 19 stores various programs for controlling the vehicle 10. The CPU 18 executes various processes by referring to the memory unit 19. The CPU 18 may be circuitry including one or more processors that operate according to a computer program, one or more dedicated hardware circuits such as an ASIC, or a combination thereof. The memory unit 19 includes memory such as a RAM and a ROM. The memory stores program code or instructions configured to cause the CPU to execute processes. The memory, or computer readable medium, include any type of medium that is accessible by general-purpose computers and dedicated computers.

The vehicle 10 has a transmission-reception system 20. The transmission-reception system 20 includes transmitters 21 and a receiver 40. Each transmitter 21 is configured to be installed in one of the four wheel assemblies 11 of the vehicle 10. The receiver 40 is configured to be installed in the vehicle 10.

Figure 2:
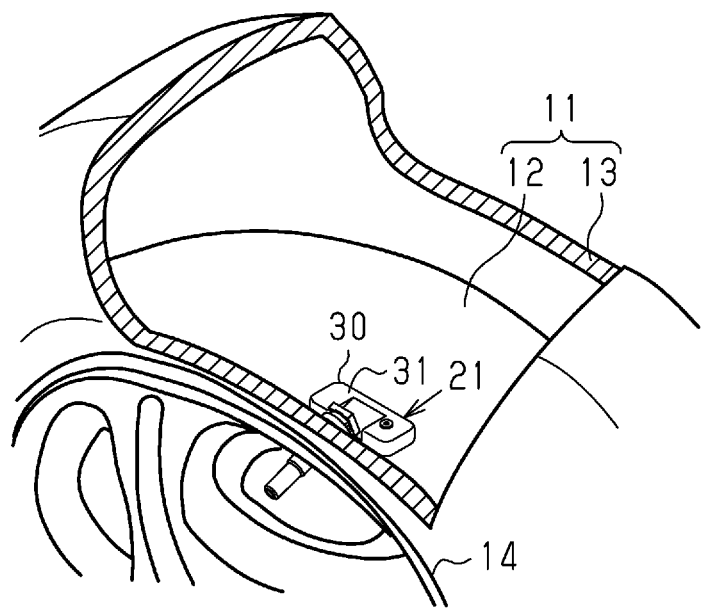
FIG. 2 is a perspective view of a transmitter attached to a wheel.
Figure 3:
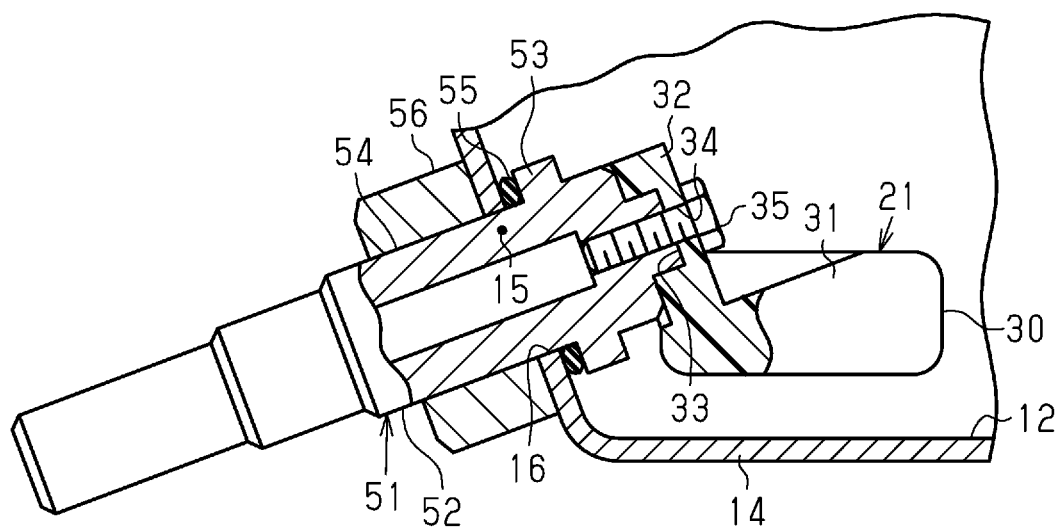
FIG. 3 is a partially cut-away diagram showing a clamp-in valve and a transmitter attached to the clamp-in valve.

As shown in FIGS. 2 and 3, the wheel assembly 11 includes a wheel 12 and a tire 13 mounted on the wheel 12. The wheel 12 includes a rim 14. The rim 14 has a mounting hole 15 extending through the rim 14. The inner circumferential surface of the mounting hole 15 is a mounting hole forming surface 16. The transmitter 21 is attached in the tire valve installed in the rim 14 of the wheel 12 to be integrated with the tire valve. The transmitter 21 is thus installed in the wheel assembly 11. The transmitter 21 is attached to the wheel 12, on which the tire 13 is mounted, such that the transmitter 21 is arranged inside the tire 13. The transmitter 21 detects the condition of the tire 13, for example, the air pressure and internal temperature of the tire 13, and wirelessly transmits a data signal including the detection results to the receiver 40. The transmission-reception system 20 is configured to monitor the condition of the tire 13 by receiving the data signal transmitted from the transmitter 21 at the receiver 40.

The transmitter 21 is configured to be attachable to multiple types of tire valves. In the first embodiment, the transmitter 21 is attachable to two types of tire valves: a clamp-in valve 51 and a snap-in valve 61.

The transmitter 21 includes a case 30. The case 30 includes a case body 31, which accommodates components of the transmitter 21, and an attachment wall 32, to which a tire valve is attached. The attachment wall 32 includes an insertion portion 33, into which a tire valve is inserted, and an insertion hole 34, into which a screw 35 for attaching the tire valve to the case 30 is inserted. The insertion portion 33 is a part of the attachment wall 32 that is recessed in the thickness direction of the attachment wall 32. The insertion hole 34 extends through the attachment wall 32 in the thickness direction of the attachment wall 32. The insertion hole 34 opens to the insertion portion 33.

The clamp-in valve 51 includes a tubular valve stem 52. The valve stem 52 is made of metal. The valve stem 52 includes a flange 53 and a fastening portion 54. The flange 53 and the fastening portion 54 are spaced apart from each other in the axial direction of the valve stem 52. The flange 53 is a part of the valve stem 52 that is locally enlarged in the radial direction. The fastening portion 54 is a part of the valve stem 52 that has a threaded outer circumferential surface, and functions as an external thread. When the clamp-in valve 51 is installed in the wheel 12, the flange 53 is located inside the tire 13, and the fastening portion 54 is located outside the tire 13. The clamp-in valve 51 is installed in the wheel 12 with a grommet 55 disposed between the wheel 12 and the flange 53. A nut 56 is mounted on the fastening portion 54. The nut 56 and the flange 53 hold the wheel 12 and the grommet 55 in between to ensure the sealing property of the mounting hole 15. When the clamp-in valve 51 is used as the tire valve, the valve stem 52 faces a mounting hole forming surface 16. When the transmitter 21 is attached to the clamp-in valve 51, a part of the valve stem 52 is inserted into the insertion portion 33. Then, the screw 35, which is inserted into the insertion hole 34, is fastened to the valve stem 52, so that the transmitter 21 is attached to the clamp-in valve 51.

Figure 4:
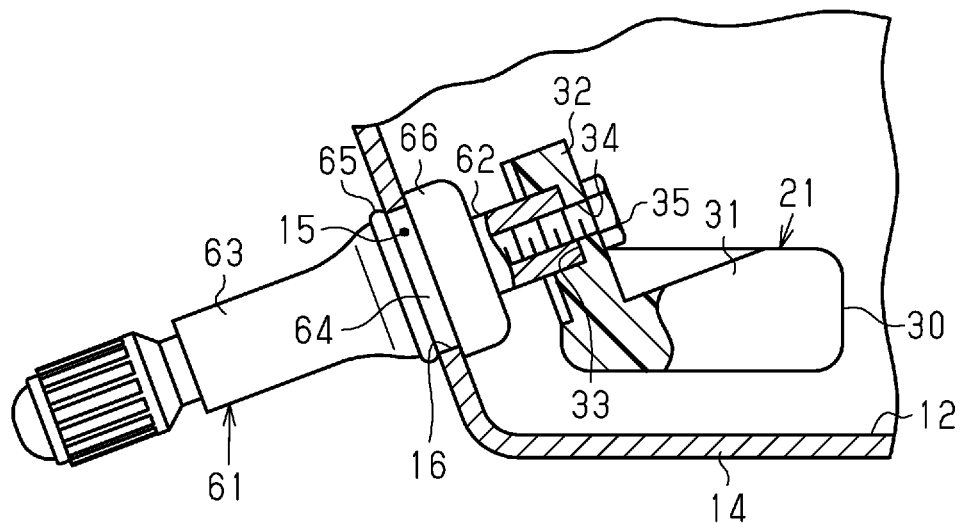
FIG. 4 is a partially cut-away diagram showing a snap-in valve and a transmitter attached to the snap-in valve.

As shown in FIG. 4, the snap-in valve 61 includes a tubular valve stem 62 and a cylindrical body 63, which is disposed on the outer circumference of the valve stem 62. The valve stem 62 is made of metal, and the body 63 is made of rubber. The opposite ends of the valve stem 62 protrudes from the body 63. The body 63 includes a mount portion 64, a first holding portion 65, and a second holding portion 66. The first holding portion 65 and the second holding portion 66 are provided on the opposite sides of the mount portion 64. The mount portion 64 is a part of the body 63 that is recessed in the radial direction and disposed over the entire circumference of the body 63. The diameter of the first holding portion 65 and the diameter of the second holding portion 66 are greater than the diameter of the mount portion 64. The snap-in valve 61 is installed in the wheel 12 by press-fitting the body 63 into the mounting hole 15. The first holding portion 65 and the second holding portion 66 hold the wheel 12 in between, and the mount portion 64 closely contacts the mounting hole forming surface 16. The body 63 of the snap-in valve 61 ensures the sealing property of the mounting hole 15. When the transmitter 21 is attached to the snap-in valve 61, a part of the valve stem 62 is inserted into the insertion portion 33. Then, the screw 35, which is inserted into the insertion hole 34, is fastened to the valve stem 62, so that the transmitter 21 is attached to the snap-in valve 61.

Figure 5:
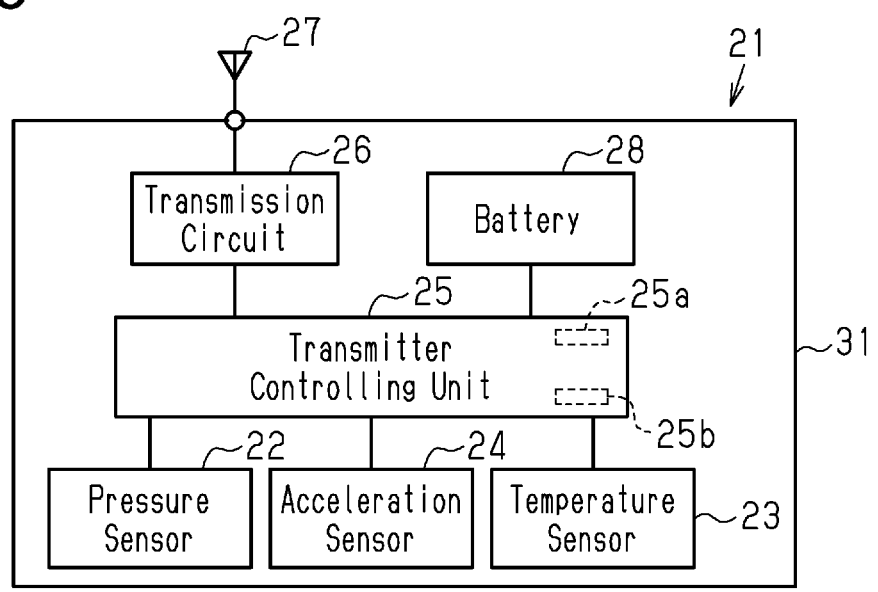
FIG. 5 is a schematic diagram showing the configuration of the transmitter.

As shown in FIG. 5, the transmitter 21 includes a pressure sensor 22, a temperature sensor 23, an acceleration sensor 24, a transmitter controlling unit 25, a transmission circuit 26, a transmission antenna 27, and a battery 28. These components are accommodated in the case body 31. The interior of the case body 31 may be molded with plastic.

The pressure sensor 22 detects the pressure of the corresponding tire 13 and outputs the detection result to the transmitter controlling unit 25. The temperature sensor 23 detects the temperature inside the corresponding tire 13 and outputs the detection result to the transmitter controlling unit 25.

The acceleration sensor 24 rotates integrally with the wheel 12 to detect the centrifugal acceleration acting on the transmitter 21. Specifically, the acceleration sensor 24 has a detection axis and detects acceleration that acts in the direction along the detection axis. The acceleration sensor 24 is disposed such that a force acting in the radial direction of the wheel 12 acts on the detection axis, so as to detect the centrifugal acceleration acting on the transmitter 21. The centrifugal acceleration acting on the transmitter 21 can be regarded as the centrifugal acceleration acting on the wheel 12. The acceleration sensor 24 outputs the detection result to the transmitter controlling unit 25.

The transmitter controlling unit 25 is composed of circuitry such as a microcomputer including a CPU 25a and a memory unit 25b such as a RAM and a ROM. An ID code, which is identification information unique to each transmitter 21, is registered in the memory unit 25b. The memory unit 25b stores various programs for controlling the transmitter 21. The transmitter controlling unit 25 may include dedicated hardware that executes at least part of various processes, that is, an application specific integrated circuit (ASIC). The transmitter controlling unit 25 may be circuitry including one or more processors that operate according to a computer program, one or more dedicated hardware circuits such as an ASIC, or a combination thereof. The processor includes a CPU and memory such as a RAM, a ROM, and the like. The memory stores program code or instructions configured to cause the CPU to execute processes. The memory, or computer readable medium, include any type of media that are accessible by general-purpose computers and dedicated computers.

The transmitter controlling unit 25 generates transmission data and outputs it to the transmission circuit 26. The transmission data includes, for example, pressure data and transmission data. The pressure data indicates the detection value of the pressure sensor 22. The temperature data indicates the detection value of the temperature sensor 23. The transmission circuit 26 modulates the transmission data from the transmitter controlling unit 25 to generate a data signal, and transmits the data signal through the transmission antenna 27. Accordingly, the transmission data is transmitted as the data signal. Any suitable modulation technique can be performed by the transmission circuit 26. The transmitter controlling unit 25 functions as a data generating unit configured to generate the transmission data. The transmission circuit 26 functions as a transmitting unit that is configured to transmit the transmission data as the data signal. The data signal is transmitted at a predetermined interval.

As shown in FIG. 1, the receiver 40 includes a receiver controlling unit 41, a reception circuit 42, and a reception antenna 43. The reception circuit 42 demodulates the data signal that has been transmitted from each transmitter 21 and received via the reception antenna 43, and delivers the demodulated signal to the receiver controlling unit 41. The reception circuit 42 functions as a receiving unit that receives the transmission data. The receiver controlling unit 41 is connected to a warning device 44.

The receiver controlling unit 41 is composed of a microcomputer including a receiver CPU 41a and a receiver memory unit 41b such as a ROM and a RAM. The receiver controlling unit 41 may include dedicated hardware that executes at least part of various processes, that is, an application specific integrated circuit (ASIC). The receiver controlling unit 41 may be circuitry including one or more processors that operate according to a computer program, one or more dedicated hardware circuits such as an ASIC, or a combination thereof. The processor includes a CPU and memory such as a RAM, a ROM, and the like. The memory stores program code or instructions configured to cause the CPU to execute processes. The memory, or computer readable medium, include any type of media that are accessible by general-purpose computers and dedicated computers.

The receiver memory unit 41b stores the ID codes of the respective transmitters 21. The receiver controlling unit 41 verifies whether the ID code included in the transmission data matches the ID code stored in the receiver memory unit 41b. If the ID code included in the transmission data matches the ID code stored in the receiver memory unit 41b, the receiver controlling unit 41 uses the pressure data and the temperature data included in the transmission data as data representing the condition of the tire 13.

The receiver controlling unit 41 acquires the condition of the tire 13 from the received transmission data. When there is an anomaly in the tire 13, the receiver controlling unit 41 issues a warning by using the warning device 44. For example, the warning device 44 may be a device that notifies the user of the anomaly by sound, or illumination or blinking of light. Also, the receiver controlling unit 41 may display the condition of the tire 13 on the display device that the occupants of the vehicle 10 can visually recognize.

The transmission-reception system 20 of the present embodiment functions to control the vehicle 10 in a manner corresponding to the type of the tire valve. The process executed by the transmitter 21 and the receiver 40 will now be described. The process allows the vehicle 10 to be controlled in a manner corresponding to the type of the tire valve.

Figure 6:
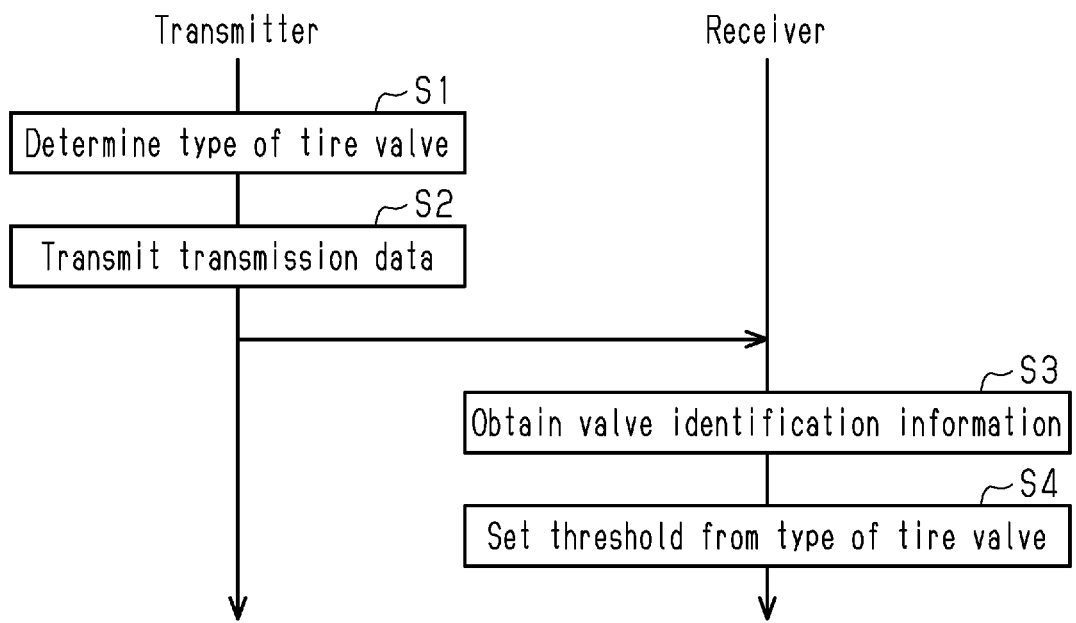
FIG. 6 is an interaction diagram of the transmitter and the receiver in the first embodiment.

As shown in FIG. 6, the transmitter controlling unit 25 determines the type of tire valve in step S1. The transmitter controlling unit 25 determines the type of the tire valve by using the detection value of the acceleration sensor 24.

The centrifugal acceleration acting on the transmitter 21 increases in proportion to the vehicle speed. That is, the force that acts on the transmitter 21 in the radially outward direction of the wheel 12 increases. The tire valve contacts the mounting hole forming surface 16 to be supported by the wheel 12. Accordingly, load tends to concentrate on the section where the tire valve contacts the mounting hole forming surface 16. When the tire valve is the clamp-in valve 51, the metal valve stem 52 contacts the mounting hole forming surface 16. Thus, even if load concentrates on the section where the tire valve contacts the mounting hole forming surface 16, the metal valve stem 52 is unlikely to be deformed. In contrast, when the tire valve is the snap-in valve 61, the rubber body 63 contacts the mounting hole forming surface 16. Since the body 63 is more likely to be deformed than the valve stem 52, the snap-in valve 61 is likely to be tilted in the radial direction of the wheel 12. Therefore, when the vehicle speed is high, the transmitter 21 is tilted to be shifted outward in the radial direction of the wheel 12 as the distance from the snap-in valve 61 increases.

Figure 7:
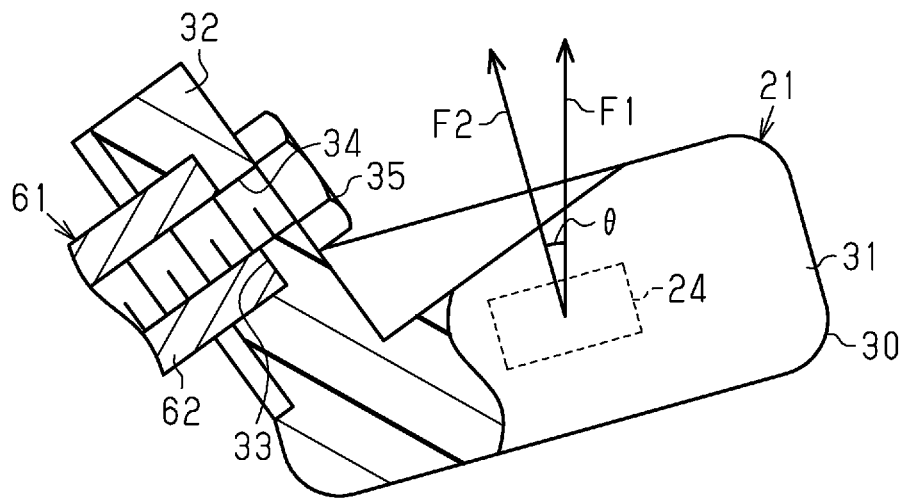
FIG. 7 is a diagram showing the centrifugal acceleration acting on the transmitter and the centrifugal acceleration detected by the acceleration sensor.

When the transmitter 21 is tilted as shown in FIG. 7, the detection value detected by the acceleration sensor 24 is smaller than that in a case in which the transmitter 21 is not tilted. As described above, the acceleration sensor 24 is attached to the transmitter 21 so as to align the detection axis with the radial direction of the wheel 12, so that the acceleration sensor 24 can detect the centrifugal acceleration. Thus, since the detection axis is tilted with respect to the radial direction of the wheel 12 when the transmitter 21 is tilted, the acceleration that can be detected using the detection axis is a component force of the centrifugal acceleration. With reference to in FIG. 7, when the centrifugal acceleration acting on the transmitter 21 is represented by F1, and the component force of the centrifugal acceleration that can be detected by the acceleration sensor 24 is represented F2, $F2=F1 \cos \theta$, where $\theta$ represents the deviation angle of the detection axis from the radial direction of the wheel 12.

Figure 8:
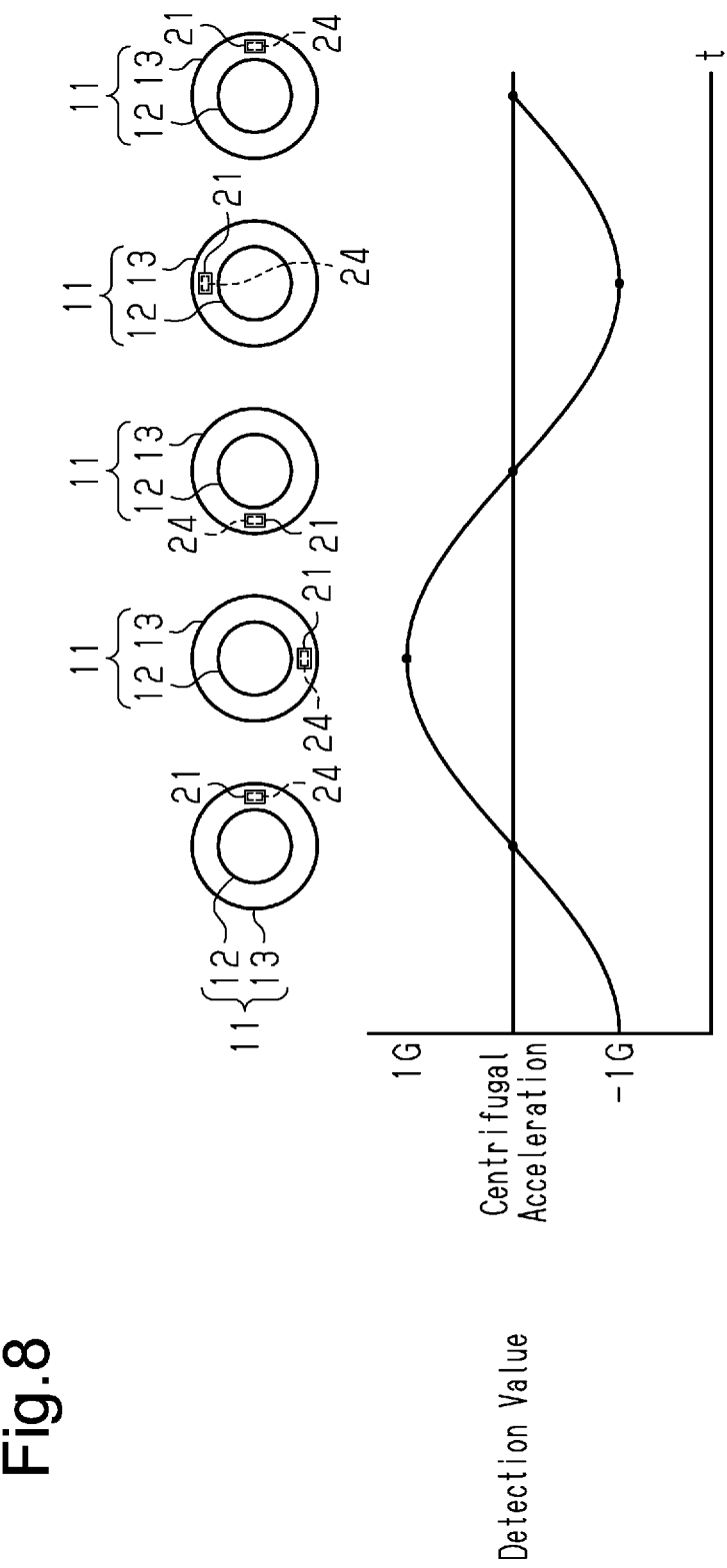
FIG. 8 is a diagram showing a correspondence relationship between the rotational position of a wheel assembly and a gravitational acceleration component.

As shown in FIG. 8, the detection value of the acceleration sensor 24 includes the gravitational acceleration component in addition to the centrifugal acceleration. The gravitational acceleration acts on the acceleration sensor 24. During one turn of the wheel assembly 11, the gravitational acceleration detected using the detection axis changes along a sine wave within the range of the centrifugal acceleration [G]±1 [G]. When the detection axis is directed vertically downward, the gravitational acceleration component is +1 [G]. When the detection axis is directed vertically upward, the gravitational acceleration component is −1 [G]. When the detection axis is tilted with respect to the vertical direction, the gravitational acceleration component has a value corresponding to the component force of the gravitational acceleration. The acceleration sensor 24 outputs, as the detection value, the value obtained by adding the gravitational acceleration component to the centrifugal acceleration.

The gravitational acceleration component changes within the range of ±1 [G] during one turn of the wheel 12. Accordingly, the period of the gravitational acceleration component can be regarded as the same as the rotation period of the wheel 12. As the vehicle speed increases, the period of the gravitational acceleration component and the rotation period of the wheel 12 both become shorter.

The transmitter controlling unit 25 calculates the rotation period of the assumed wheel 12 from the detection value of the acceleration sensor 24. The centrifugal acceleration increases as the vehicle speed increases and as the rotation period of the wheel 12 becomes shorter. There is thus a correlation between the rotation period of the wheel 12 and the centrifugal acceleration. Using the correlation, it is possible to calculate the rotation period of the wheel 12 that is assumed from the detection value of the acceleration sensor 24. When the tire valve is the clamp-in valve 51, the difference between the rotation period of the wheel 12 that is assumed from the detection value of the acceleration sensor 24 and the period of the gravitational acceleration component included in the detection value of the acceleration sensor 24 falls within a predetermined permissible range. The predetermined range is a set by factoring in errors and tolerances of the components. In contrast, when the tire valve is the snap-in valve 61, the centrifugal acceleration detected by the acceleration sensor 24 is smaller than the centrifugal acceleration acting on the transmitter 21. Thus, the difference between the rotation period of the wheel 12 that is assumed from the detection value of the acceleration sensor 24 and the period of the gravitational acceleration component included in the detection value of the acceleration sensor 24 is out of the predetermined permissible range. Thus, if the difference between the rotation period of the wheel 12 that is assumed from the detection value of the acceleration sensor 24 and the period of the gravitational acceleration component included in the detection value of the acceleration sensor 24 (the actual rotation period of the wheel 12) falls within the predetermined permissible range, the transmitter controlling unit 25 determines that the tire valve is the clamp-in valve 51. In contrast, if the difference between the rotation period of the wheel 12 that is assumed from the detection value of the acceleration sensor 24 and the period of the gravitational acceleration component included in the detection value of the acceleration sensor 24 (the actual rotation period of the wheel 12) is out of the predetermined permissible range, the transmitter controlling unit 25 determines that the tire valve is the snap-in valve 61. The transmitter controlling unit 25 functions as a determining unit by executing the process of step S1. The determination result of step S1 is stored, for example, in the RAM of the memory unit 25b.

Figures 9, 10, 11:
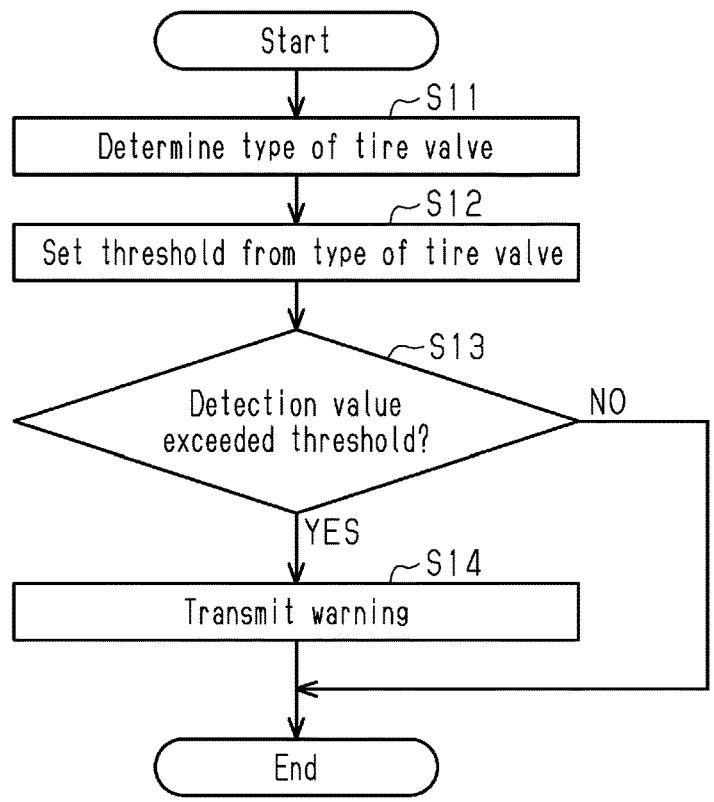
FIG. 9 is a diagram showing one example of transmission data.
FIG. 10 is a diagram showing a correspondence relationship between the types of tire valve and thresholds for controlling the vehicle.
FIG. 11 is a flowchart showing a process executed by a transmitter controlling unit in a second embodiment.

Next, in step S2, the transmitter controlling unit 25 generates the transmission data, which includes the valve identification information. As shown in FIG. 9, the transmitter controlling unit 25 generates the transmission data that includes a preamble, an ID code, and valve identification information. That is, the transmitter controlling unit 25 generates the transmission data, which includes the valve identification information, in addition to the pressure data and the temperature data. In the first embodiment, the valve identification information indicates the type of the tire valve. The valve identification information is configured to cause the receiver controlling unit 41 to recognize the type of the tire valve to which the transmitter 21 is attached. The valve identification information is, for example, information of one bit. The valve identification information being 0 represents the clamp-in valve 51, and the valve identification information being 1 represents the snap-in valve 61. The valve identification information may be information of two or more bits. The transmitter controlling unit 25 outputs the generated transmission data to the transmission circuit 26. The transmission circuit 26 transmits the data signal obtained by modulating the transmission data to the receiver 40. The transmitter controlling unit 25 functions as a controlling unit by executing the process of step S2.

When the receiver controlling unit 41 receives the transmission data in step S3 as shown in FIG. 6, the receiver controlling unit 41 obtains the type of the tire valve from the valve identification information included in the transmission data. The receiver controlling unit 41 functions as an obtaining unit that obtains the valve identification information by executing the process of step S3.

Next, if the valve identification information is 0 in step S4, the receiver controlling unit 41 recognizes that the transmitter 21 is attached to the clamp-in valve 51. If the valve identification information is 1, the receiver controlling unit 41 recognizes that the transmitter 21 is attached to the snap-in valve 61. The receiver controlling unit 41 sets the threshold for controlling the vehicle 10 in accordance with the type of the tire valve. In the first embodiment, the receiver controlling unit 41 sets the threshold used in the receiver controlling unit 41 to a threshold corresponding to the type of the tire valve. The receiver controlling unit 41 transmits the threshold corresponding to the type of the tire valve, thereby setting the threshold used to control the ECU 17. In the first embodiment, the receiver controlling unit 41 sets both of the threshold used in the control in the receiver controlling unit 41 and the threshold used in the control of the ECU 17.

As shown in FIG. 10, the receiver memory unit 41b stores the correspondence relationship between the type of the tire valve and the thresholds. The first embodiment uses two thresholds: an upper limit of the vehicle speed and a warning threshold. When the tire valve is the clamp-in valve 51, a first vehicle speed threshold and a first pressure threshold are set. When the tire valve is the snap-in valve 61, a second vehicle speed threshold and a second pressure threshold are set. The upper limit of the vehicle speed is the threshold of the maximum speed allowed for the vehicle 10. The warning threshold is the threshold of the maximum pressure allowed for the tire 13.

The first vehicle speed threshold, to which the upper limit of the vehicle speed is set, is higher than the second vehicle speed threshold. When the clamp-in valve 51 is used as the tire valve, the upper limit of the vehicle speed is set to be higher than in a case in which the snap-in valve 61 is used as the tire valve. As described above, the snap-in valve 61 is likely to be tilted when the vehicle speed increases. The sealing property of the mounting hole 15 may fail to be ensured. As such, the upper limit of the vehicle speed for the snap-in valve 61 is set to be lower than that for the clamp-in valve 51.

The first pressure threshold, to which the warning threshold is set, is higher than the second pressure threshold. The maximum pressure that can be handled by the snap-in valve 61 is lower than that of the clamp-in valve 51. Accordingly, the first pressure threshold in a case in which the clamp-in valve 51 is used as the tire valve is set to be higher than the second pressure threshold in a case in which the snap-in valve 61 is used as the tire valve. The receiver controlling unit 41 functions as a setting unit by executing the process of step S3.

The process from step S1 to step S4 may be executed when a predetermined condition is met, for example, when the standing time of the vehicle 10 reaches or exceeds a predetermined time. Alternatively, the process from step S1 to step S4 may be repeatedly executed while the vehicle 10 is traveling. The determination of whether the vehicle 10 is traveling and the detection of the standing time of the vehicle 10 can be performed by using, for example, the detection value of the acceleration sensor 24.

An operation of the first embodiment will now be described.

The transmitter 21 transmits the transmission data including the valve identification information. With this, thresholds corresponding to the type of the tire valve are set in the receiver controlling unit 41 and the ECU 17. The ECU 17 sets the upper limit of the vehicle speed in accordance with the type of the tire valve. The ECU 17 controls the vehicle 10 such that the vehicle speed will not exceed the upper limit of the vehicle speed. The ECU 17 may perform control in which the upper limit of the vehicle speed is shown on the display device that is visually recognizable by the occupants. In this manner, the ECU 17 is capable of performing various types of control by using the upper limit of the vehicle speed. The upper limit of the vehicle speed is set to different values in accordance with the type of the tire valve. That is, the upper limit of the vehicle speed is set to a value suitable for the type of the tire valve.

The receiver controlling unit 41 sets the warning threshold in accordance with the type of the tire valve. The receiver controlling unit 41 recognizes the pressure of the tire 13 from the pressure data included in the transmission data. When the pressure of the tire 13 exceeds the warning threshold, the receiver controlling unit 41 issues a warning using the warning device 44. Also, when the pressure of the tire 13 exceeds the warning threshold, the receiver controlling unit 41 may perform control in which a warning is shown on the display device that is visually recognizable by the occupants. In this manner, the receiver controlling unit 41 is capable of performing various types of control by using the warning threshold. The warning threshold is set to different values in accordance with the type of the tire valve. That is, the warning threshold is set to a value suitable for the type of the tire valve. For example, if the snap-in valve 61 is installed in the wheel assembly 11 to which the clamp-in valve 51 should be attached, the warning device 44 can issue a warning.

The first embodiment has the following advantages.

(1-1) The transmitter controlling unit 25 transmits the transmission data including the valve identification information from the transmission circuit 26. This allows the receiver controlling unit 41 to recognize the type of the tire valve to which the transmitter 21 is attached from the valve identification information. The receiver controlling unit 41 sets the threshold for controlling the vehicle 10 in accordance with the type of the tire valve. The vehicle 10 can thus be controlled properly in accordance with the type of the tire valve.

(1-2) The detection value detected by the acceleration sensor 24 is different between the clamp-in valve 51 and the snap-in valve 61 when the vehicle speed is high. The transmitter controlling unit 25 utilizes the difference in the detection value of the acceleration sensor 24 between the clamp-in valve 51 and the snap-in valve 61 to determine whether the tire valve to which the transmitter 21 is attached is the clamp-in valve 51 or the snap-in valve 61. As such, valve identification information does not have to be written in the memory unit 25b of the transmitter 21.

(1-3) The receiver controlling unit 41 recognizes the type of the tire valve from the valve identification information obtained from the transmission data. The receiver controlling unit 41 is capable of setting a threshold corresponding to the type of the tire valve from the correspondence relationship between the recognized type of the tire valve and the threshold for controlling the vehicle 10. The vehicle 10 can thus be controlled properly in accordance with the type of the tire valve.

(1-4) The pressure of the tire 13 that can be handled varies depending on whether the tire valve is the clamp-in valve 51 or the snap-in valve 61. In this regard, the receiver controlling unit 41 sets different warning thresholds in accordance with whether the tire valve is the clamp-in valve 51 or the snap-in valve 61. Therefore, the warning threshold can be set and a warning can be issued in accordance with the type of the tire valve.

(1-5) Vehicle speeds that can be handled may vary depending on the type of the tire valve. In this regard, the receiver controlling unit 41 sets different upper limits of the vehicle speed in accordance with whether the tire valve is the clamp-in valve 51 or the snap-in valve 61. Therefore, the upper limit of the vehicle speed can be set and control of the vehicle can be performed in accordance with the type of the tire valve.

Second Embodiment

A transmitter 21 according to a second embodiment will now be described.

The transmitter of the second embodiment is different from that of the first embodiment in the process executed by the transmitter controlling unit. The hardware configuration of the transmitter and the receiver is similar to the first embodiment. The process executed in the transmitter will now be described.

As shown in FIG. 11, the transmitter controlling unit 25 determines the type of tire valve in step S11. The determination of the type of the tire valve is the same as that of step S1 in the first embodiment. That is, the transmitter controlling unit 25 uses the detection value of the acceleration sensor 24 to determine whether the tire valve is the clamp-in valve 51 or the snap-in valve 61. The transmitter controlling unit 25 determines the type of the tire valve by performing determination using the detection value of the acceleration sensor 24. That is, the transmitter controlling unit 25 functions as a determining unit that is configured to determine the type of the tire valve by executing the process of step S11.

Subsequently, in step SS12, the transmitter controlling unit 25 sets the threshold for controlling the vehicle 10 in accordance with the type of the tire valve. In the second embodiment, the warning threshold of the first embodiment is set. When the tire valve is the clamp-in valve 51, the transmitter controlling unit 25 sets the warning threshold to the first pressure threshold. When the tire valve is the snap-in valve 61, the transmitter controlling unit 25 sets the warning threshold to the second pressure threshold. That is, the transmitter controlling unit 25 functions as a warning threshold setting unit by executing the process of step S12. The correspondence relationship between the type of the tire valve and warning threshold is stored in the memory unit 25b, which functions as a transmitter memory unit.

In the subsequent step S13, the transmitter controlling unit 25 determines whether the detection value of the pressure sensor 22 has exceeded the threshold set in step S12. In a case in which the first pressure threshold is set in step S12, the transmitter controlling unit 25 determines whether the detection value of the pressure sensor 22 has exceeded the first pressure threshold. In a case in which the second pressure threshold is set in step S12, the transmitter controlling unit 25 determines whether the detection value of the pressure sensor 22 has exceeded the second warning threshold. If the determination result of step S13 is negative, the transmitter controlling unit 25 ends the process. If the determination result of step S13 is affirmative, the transmitter controlling unit 25 proceeds to step S14.

In step S14, the transmitter controlling unit 25 performs warning transmission. The warning transmission refers to transmission performed by the transmission circuit 26 to transmit a signal requesting a warning to the occupants to the receiver 40. The signal includes, for example, a warning flag. That is, the transmitter controlling unit 25 functions as a warning transmission controlling unit by executing the process of step S14.

The process of step S11 to step S14 is repeatedly executed at a predetermined control period. Alternatively, only the process of step S13 and step S14 may be repeated after the threshold is set in the process of step S11 and step S12. In this case, the process of step S11 and step S12 may be executed again when a predetermined condition is met, for example, when the standing time of the vehicle 10 reaches or exceeds a predetermined time. The standing time of the vehicle 10 can be acquired by using, for example, the detection value of the acceleration sensor 24.

When receiving a signal transmitted from the transmitter 21 through the warning transmission, the receiver controlling unit 41 of the second embodiment issues a warning using the warning device 44 or using a display device visually recognizable by the occupants. That is, in the second embodiment, the receiver controlling unit 41 does not set the threshold corresponding to the type of the tire valve.

The second embodiment has the following advantages.

(2-1) The transmitter controlling unit 25 sets the warning threshold in accordance with the type of the tire valve. When the detection value of the pressure sensor 22 exceeds the warning threshold, the transmitter controlling unit 25 performs the warning transmission, thereby causing the receiver 40 to issue a warning. That is, the transmitter controlling unit 25 is capable of causing the receiver 40 to perform a warning, which is one mode of the control of the vehicle 10, in accordance with the type of the tire valve. The vehicle 10 can thus be controlled properly in accordance with the type of the tire valve.

(2-2) A warning can be issued in accordance with the type of the tire valve without setting the warning threshold corresponding to the type of the tire valve by the receiver controlling unit 41. Therefore, a warning can be issued in accordance with the type of the tire valve, while simplifying the software of the receiver controlling unit 41.

The above-described embodiments may be modified as follows. The embodiments and the following modifications can be combined as long as the combined modifications remain technically consistent with each other.

In each of the embodiments, the memory unit 25*b* may store in advance valve identification information corresponding to the type of the tire valve to which the transmitter 21 is attached. The valve identification information may be written in the memory unit 25*b* of the transmitter 21 when the transmitter 21 is produced or may be written in the memory unit 25*b* of the transmitter 21 using an external device such as a trigger device. In this case, the transmitter controlling unit 25 does not have to determine the type of the tire valve from the detection value of the acceleration sensor 24. That is, the transmitter 21 does not have to include a determining unit. In this case, the transmitter 21 may include the acceleration sensor 24.

In each of the embodiments, it suffices if the transmitter 21 includes at least one sensor that is capable of detecting at least one of the condition of the tire 13 and the condition of the road surface. That is, it suffices if the transmitter 21 includes at least one of the pressure sensor 22, which is capable of detecting pressure as the condition of the tire 13, the temperature sensor 23, which is capable of detecting the temperature as the condition of the tire 13, and the acceleration sensor 24, which is capable of detecting the centrifugal acceleration acting on the tire 13 as the condition of the tire 13. One example of the sensor that detects the condition of the road surface is the acceleration sensor 24. One examples of the condition of the road surface is the friction coefficient of the road surface during traveling. The friction coefficient of the road surface can be calculated by detecting the acceleration of the vehicle 10 in the traveling direction and the lateral acceleration using the acceleration sensor 24.

In each of the embodiments, the type of the tire valve may be classified into more than two types: the clamp-in valve 51 and the snap-in valve 61. The clamp-in valve 51 may be further classified into several types of different sizes and shapes. The snap-in valve 61 may also be classified into several types of different sizes and shapes. Pressures and vehicle speeds that can be handled may vary depending on the type of the clamp-in valve 51. Pressures and vehicle speeds that can be handled may vary depending on the type of the snap-in valve 61. Thus, the type of the tire valve may refer to various types of the clamp-in valve 51 or various types of the snap-in valve 61. Therefore, a different threshold for control of the vehicle 10 may be associated with each type of the clamp-in valve 51 and the snap-in valve 61.

In each of the embodiments, the control for causing the receiver controlling unit 41 to recognize the type of the tire valve, which is, for example, determination of the type of the tire valve by the transmitter 21, or transmission of the transmission data including the valve identification information, may be performed only when a specified condition is met. Likewise, the receiver controlling unit 41 may set the threshold corresponding to the type of the tire valve only when a specified condition is met. The specified condition may be, for example, a condition in which the type of the wheel 12 is a specified type of wheel or a condition in which the temperature is excessively low or high. The type of the wheel 12 may be a steel wheel or an aluminum wheel. A steel wheel tends to be thinner at the part to which the tire valve is attached than an aluminum wheel, so that load tends to locally concentrate on the tire valve. Accordingly, the specified condition may include a condition that the type of the wheel 12 is a steel wheel. Further, since the pressure in the tire 13 fluctuates depending on the temperature, a low temperature threshold for detecting that the temperature is excessively low or a high temperature threshold for detecting that the temperature is excessively high may be set. The specified condition may include a condition that the temperature is lower than the low temperature threshold or a condition that the temperature is higher than or equal to the high temperature threshold.

In each of the embodiments, the transmitter 21 may have any configuration as long as it can be attached to two or more types of tire valves. For example, the transmitter may include an attachment portion for the clamp-in valve 51 and an attachment portion for the snap-in valve 61.

In each of the embodiments, the acceleration sensor 24 may have two or more detection axes. For example, the acceleration sensor 24 may include a first detection axis that detects the centrifugal acceleration and a second detection axis that is orthogonal to the first detection axis and extends in the radial direction of the wheel 12. In this case, a component included in the second detection value may be used as the gravitational acceleration component included in the detection value of the acceleration sensor 24.

In each of the embodiments, as long as the transmitter controlling unit 25 is capable of determining that the tire valve is either the clamp-in valve 51 or the snap-in valve 61 from the detection value of the acceleration sensor 24, the method of determination may be different from those in the embodiments. When the tire valve is the snap-in valve 61, the centrifugal acceleration that is detected when the vehicle speed is high is smaller than when the tire valve is the clamp-in valve 51. Thus, in the transmitter 21 attached to the clamp-in valve 51, the detection value of the acceleration sensor 24 increases in proportion to the vehicle speed. In contrast, in the transmitter 21 attached to the snap-in valve 61, increase in the detection value of the acceleration sensor 24 in relation to increase in the vehicle speed decreases. Thus, whether the tire valve is the clamp-in valve 51 or the snap-in valve 61 can be determined based on fluctuation of the detection value of the acceleration sensor 24 in relation to fluctuation of the rotation period of the wheel 12. Also, the transmitter controlling unit 25 may calculate the centrifugal acceleration assumed to be acting on the transmitter 21 from the period of a gravitational acceleration component. If the difference between the assumed centrifugal acceleration and the detection value of the acceleration sensor 24 is within a permissible range, the transmitter controlling unit 25 may determine that the tire valve is the clamp-in valve 51. If the difference is out of the permissible range, the transmitter controlling unit 25 may determine that the tire valve is the snap-in valve 61.

In each of the embodiments, it suffices if the receiver controlling unit 41 sets a threshold for a device that is required to set a threshold corresponding to the type of the tire valve. That is, the receiver controlling unit 41 may set a threshold for the receiver controlling unit 41 or the ECU 17.

In each of the embodiments, as long as the threshold for controlling the vehicle 10 is preferably changed in accordance with the type of the tire valve, the threshold may be other than the upper limit of the vehicle speed or the warning threshold.

In each of the embodiments, it suffices if the transmission data includes at least data for causing the receiver 40 to transmit the transmission data and the valve identification information.

In each of the embodiments, the vehicle 10 may be a motorcycle or a vehicle having five or more wheel assemblies 11.

In each of the embodiments, the receiver controlling unit 41 may set the upper limit of the vehicle speed or the warning threshold in accordance with the type of the tire valve.

In the first embodiment, the valve identification information may indicate the snap-in valve 61 when having a value of 0, and may indicate the clamp-in valve 51 when having a value of 1.

In the first embodiment, the valve identification information for allowing the receiver controlling unit 41 to recognize the type of the tire valve may be information that directly indicates the type of the tire valve. For example, the valve identification information may be the value of the ID code, the transmission interval of the data signal, the method of calculating an error correction code or an error detection code, or a detection value of the acceleration sensor 24.

When the value of the ID code is used as the valve identification information, the ID code may be represented as a hexadecimal number. In this case, a group of the ID codes in which the value of the most significant digit is 0 to 7 is associated with the clamp-in valve 51. A group of the ID codes in which the value of the most significant digit is 8 to F is associated with the snap-in valve 61. An ID code corresponding to the type of the tire valve is registered in the transmitter 21 depending on the type of the attached tire valve. The correspondence relationship between the groups of the ID codes and the types of the tire valves is stored in the receiver memory unit 41b. The receiver controlling unit 41 is capable of recognizing the type of the tire valve from the ID code included in the transmission data.

When the transmission interval of the data signal is used as the valve identification information, the transmitter controlling unit 25 changes the transmission interval of the data signal in accordance with the type of the tire valve. For example, the transmission interval of the data signal is made shorter when the tire valve to which the transmitter 21 is attached is the clamp-in valve 51 than when the tire valve to which the transmitter 21 is attached is the snap-in valve 61. The transmission interval of the data signal can be set using an external device such as a trigger device. The correspondence relationship between the transmission interval of the data signal and the types of the tire valves is stored in the receiver memory unit 41b. The receiver controlling unit 41 is capable of recognizing the type of the tire valve from the transmission interval of the transmission data.

When the method of calculating an error correction code or an error detection code is used as the valve identification information, the transmitter controlling unit 25 changes the method of calculating the error correction code or the error detection code in accordance with the type of the tire valve. For example, the data used in the calculation of the error correction code is made different between when the tire valve to which the transmitter 21 is attached is the clamp-in valve 51 and when the tire valve to which the transmitter 21 is attached is the snap-in valve 61. The correspondence relationship between the method of calculating the error correction code and the types of the tire valves is stored in the receiver memory unit 41b. The receiver controlling unit 41 calculates the error correction code using two calculation methods: the calculation method corresponding to the clamp-in valve 51 and the calculation method corresponding to the snap-in valve 61. The receiver controlling unit 41 selects one of the error correction codes, which have been calculated by the two calculation methods. Specifically, the receiver controlling unit 41 selects the error correction code that matches the error correction code included in the transmission data. The receiver controlling unit 41 recognizes, as the tire valve to which the transmitter 21 is attached, the type of the tire valve that corresponds to the calculation method that has calculated the selected error correction code. Although an error correction code is used in the above-described example, the same applies to an error detection code.

When the detection value of the acceleration sensor 24 is used as the valve identification information, the transmitter controlling unit 25 transmits the data signal while including the detection value of the acceleration sensor 24 into the transmission data. The receiver controlling unit 41 obtains the vehicle speed information from the vehicle speed sensor mounted in the vehicle 10 and recognizes the type of the tire valve from the relationship between the detection value of the acceleration sensor 24 and the vehicle speed. As described in the first embodiment, the detection value of the acceleration sensor 24 increases in proportion to the vehicle speed. If the vehicle speed is the same, the detection value of the acceleration sensor 24 transmitted from the transmitter 21 attached to the clamp-in valve 51 is greater than the detection value of the acceleration sensor 24 transmitted from the transmitter 21 attached to the snap-in valve 61. The use of this correspondence relationship allows the receiver controlling unit 41 to recognize whether the tire valve is the clamp-in valve 51 or the snap-in valve 61. For example, the receiver controlling unit 41 may calculate the vehicle speed assumed from the detection value of the acceleration sensor 24. If the difference between the calculated vehicle speed and the vehicle speed obtained from the vehicle speed sensor is within a permissible range, the receiver controlling unit 41 may determine that the tire valve is the clamp-in valve 51. If the difference is out of the permissible range, the receiver controlling unit 41 may determine that the tire valve is the snap-in valve 61.

In the first embodiment, when the information indicating the clamp-in valve 51 and the information indicating the snap-in valve 61 are both included in the valve identification information included in the transmission data transmitted from each transmitter 21, the receiver controlling unit 41 may set warning thresholds separately for the respective wheel assemblies 11. In this case, the receiver controlling unit 41 is preferably capable of issuing a warning separately for the respective wheel assemblies 11 using the warning device 44 or the display device. Likewise, when the information indicating the clamp-in valve 51 and the information indicating the snap-in valve 61 are both included in the valve identification information included in the transmission data transmitted from each transmitter 21, the receiver controlling unit 41 may set the upper limit of the vehicle speed to the lowest value. That is, the receiver controlling unit 41 may set the upper limit of the vehicle speed to the second vehicle speed threshold corresponding to the snap-in valve 61. When the valve identification information includes information indicating the clamp-in valve 51 and information indicating the snap-in valve 61, the wheel assembly 11 may have been replaced by a spare tire. If the wheel assembly 11 mounted to the vehicle 10 and the spare tire have different types of tire valves, the valve identification information from the respective transmitters 21 includes information indicating different types of tire valves.

In the first embodiment, the ECU 17 may be regarded as a part of a receiver. That is, any type of receiver can be employed as long as it includes a device having a function of receiving transmission data and a device that sets a threshold for controlling the vehicle 10 in accordance with the type of the tire valve. In this case, the memory unit 19 of the ECU 17 may store a correspondence relationship between the valve identification information and the thresholds for controlling the vehicle 10. The receiver controlling unit 41 may obtain the valve identification information and send it to the ECU 17, so that the ECU 17 sets the threshold for controlling the vehicle 10. In this case, the memory unit 19 of the ECU 17 functions as a receiver memory unit, and the ECU 17 functions as a setting unit.

In the second embodiment, identification of the type of the tire valve in step S11 may be performed by storing the types of tire valves in the memory unit 25*b* in advance and referring to the memory unit 25*b*.

In the second embodiment, the threshold set in step S12 may be the upper limit of the vehicle speed. In this case, the transmitter controlling unit 25 sets the first vehicle speed threshold when the tire valve is the clamp-in valve 51, and sets the second vehicle speed threshold when the tire valve is the snap-in valve 61. The correspondence relationship between the type of the tire valve and the upper limit of the vehicle speed is stored in the memory unit 25*b*. In step S13, the transmitter controlling unit 25 determines whether the detection value of the acceleration sensor 24 has exceeded the threshold. The determination of step S13 may be performed by using the detection value [G] of the acceleration sensor 24 or by using the vehicle speed [km/h] that has been calculated from the detection value of the acceleration sensor 24. When the determination of step S13 is performed by using the detection value [G] of the acceleration sensor 24, the first vehicle speed threshold and the second vehicle speed threshold are set as values of the acceleration [G]. When the determination of step S13 is performed by using the vehicle speed [km/h] calculated from the detection value of the acceleration sensor 24, the first vehicle speed threshold and the second vehicle speed threshold are set as values of the vehicle speed [km/h]. Since there is a correlation between the vehicle speed and the detection value of the acceleration sensor 24, the vehicle speed and the acceleration are interchangeable. As described in the first embodiment, when the tire valve is the snap-in valve 61, a high vehicle speed creates a difference between the centrifugal acceleration acting on the transmitter 21 and the centrifugal acceleration detected by the acceleration sensor 24. When the tire valve is the snap-in valve 61, the transmitter controlling unit 25 may correct the detection value detected by the acceleration sensor 24, thereby reducing the difference between the detection value and the centrifugal acceleration acting on the transmitter 21. When the detection value of the acceleration sensor 24 exceeds the upper limit of the vehicle speed, the warning transmission is performed.

In this case, the transmitter controlling unit 25 can set an upper limit of the vehicle speed corresponding to the type of the tire valve. When the detection value of the acceleration sensor 24 exceeds the vehicle speed threshold, the transmitter controlling unit 25 performs the warning transmission by causing the transmission circuit 26 to transmit a signal. If this causes the vehicle speed to exceed the upper limit of the vehicle speed, the transmitter controlling unit 25 causes the receiver 40 to issue a warning. That is, the transmitter controlling unit 25 is capable of causing the receiver 40 to perform warning, which is one mode of the control of the vehicle 10, in accordance with the type of the tire valve. The vehicle 10 can thus be controlled properly in accordance with the type of the tire valve.

DESCRIPTION OF THE REFERENCE NUMERALS

10 . . . Vehicle; 12 . . . Wheel; 13 . . . Tire; 20 . . . Transmission-Reception System; 21 . . . Transmitter; 22 . . . Pressure Sensor; 24 . . . Acceleration Sensor; 25 . . . Transmitter controlling unit functioning as Data Generating Unit, Controlling Unit, Determining Unit, Identifying Unit, Warning Transmission Controlling Unit, and Warning Threshold Setting Unit; 25*b* . . . Memory Unit functioning as Transmitter Memory Unit; 26 . . . Transmission Circuit as Transmitting Unit; 40 . . . Receiver; 41 . . . Receiver Controlling Unit functioning as Obtaining Unit and Setting Unit; 41*b* . . . Receiver Memory Unit; 42 . . . Reception Circuit as Receiving unit; 51 . . . Clamp-In Valve as Tire Valve; 61 . . . Snap-In Valve as Tire Valve

The invention claimed is:

1. A transmitter configured to be attachable to a plurality of types of tire valves, comprising:
   a data generating unit configured to generate transmission data;
   a transmitting unit configured to transmit the transmission data to a receiver that includes a setting unit that sets a threshold for controlling a vehicle in accordance with the type of the tire valve, wherein the type of tire valve includes a snap-in valve or a clamp in valve;
   an acceleration sensor configured to detect a centrifugal acceleration that acts on the transmitter as a wheel rotates;

a determining unit configured to determine whether the tire valve to which the transmitter is attached is the snap-in valve or the clamp-in valve based on the centrifugal acceleration detected by the acceleration sensor and a period of a gravitational acceleration component included in a detection value of the acceleration sensor; and a controlling unit that causes the transmitting unit to transmit the transmission data, the transmission data being information with which the setting unit sets the threshold, and the transmission data including valve identification information for causing the setting unit to recognize the type of the tire valve to which the transmitter is attached.

2. A transmitter configured to be attachable to a plurality of types of tire valves, comprising:

a pressure sensor configured to detect a pressure of a tire including a snap-in valve or a clamp in valve;

a data generating unit configured to generate transmission data;

a transmitting unit configured to transmit the transmission data to a receiver;

an acceleration sensor configured to detect a centrifugal acceleration that acts on the transmitter as a wheel rotates;

a determining unit configured to determine the type of the tire valve to which the transmitter is attached is the snap-in valve or the clamp-in valve based on the centrifugal acceleration detected by the acceleration sensor and a period of a gravitational acceleration component included in a detection value of the acceleration sensor;

a warning transmission controlling unit configured to cause the transmitting unit to perform warning transmission for causing the receiver to issue a warning when a detection value of the pressure sensor exceeds a threshold;

a transmitter memory unit configured to store a correspondence relationship between the type of the tire valve and the threshold; and a warning threshold setting unit configured to set, from the correspondence relationship, the threshold in accordance with the type of the tire valve determined by the determining unit.

3. A transmitter configured to be attachable to a plurality of types of tire valves, comprising:

an acceleration sensor configured to detect a centrifugal acceleration that acts on the transmitter as a wheel rotates;

a data generating unit configured to generate transmission data;

a transmitting unit configured to transmit the transmission data to a receiver;

a determining unit configured to determine the type of the tire valve to which the transmitter is attached, wherein the type of tire valve is a snap-in valve or the clamp-in valve and wherein determining the type of tire valve is based on the centrifugal acceleration detected by the acceleration sensor and a period of a gravitational acceleration component included in a detection value of the acceleration sensor;

a warning transmission controlling unit configured to cause the transmitting unit to perform warning transmission for causing the receiver to issue a warning when a detection value of the acceleration sensor exceeds a threshold;

a transmitter memory unit configured to store a correspondence relationship between the type of the tire valve and the threshold; and a warning threshold setting unit configured to set, from the correspondence relationship, the threshold in accordance with the type of the tire valve determined by the determining unit.

4. A receiver configured to receive transmission data transmitted from a transmitter attachable to a plurality of types of tire valves, the receiver comprising:

a receiving unit configured to receive the transmission data;

a receiving memory unit configured to store a correspondence relationship between the type of the tire valve and a threshold for controlling a vehicle, wherein the type of tire valve includes a snap-in valve or a clamp in valve which is determined by the transmitter based on a centrifugal acceleration detected by an acceleration sensor and a period of a gravitational acceleration component included in a detection value of the acceleration sensor;

an obtaining unit configured to obtain valve identification information corresponding to the snap-in valve or the clamp-in valve based on the transmitter determination from the transmission data received by the receiving unit; and a setting unit configured to recognize, from the valve identification information, the type of the tire valve to which the transmitter is attached, and setting, from the correspondence relationship, the threshold in accordance with the recognized type of the tire valve.

5. The receiver according to claim 4, wherein
the transmission data includes pressure data of a tire, and
the threshold includes a warning threshold for causing a warning to be issued when the pressure of the tire reaches or exceeds the threshold.

6. The receiver according to claim 4, wherein the threshold includes an upper limit of a vehicle speed of the vehicle.

7. A transmission-reception system comprising:

a transmitter configured to be attachable to a plurality of types of tire valves wherein the type of tire valve includes a snap-in valve or a clamp in valve; and a receiver configured to receive transmission data transmitted from the transmitter, wherein the transmitter includes
a data generating unit configured to generate the transmission data,
a transmitting unit configured to transmit the transmission data, and
a controlling unit that causes the transmitting unit to transmit the transmission data including valve identification information for causing the type of the tire valve to which the transmitter is attached to be recognized, wherein the valve identification information is determined by the transmitter based on a centrifugal acceleration detected by an acceleration sensor and a period of a gravitational acceleration component included in a detection value of the acceleration sensor, and the receiver includes
a receiving unit configured to receive the transmission data,
a receiving memory unit configured to store a correspondence relationship between the type of the tire valve and a threshold for controlling a vehicle, an obtaining unit configured to obtain the valve identification information from the transmission data received by the receiving unit, and a setting unit configured to recognize, from the valve identification information, the type of the tire valve to which the transmitter is attached, and setting, from the correspondence relationship, the threshold in accordance with the recognized type of the tire valve.

* * * * *